Figure 1:
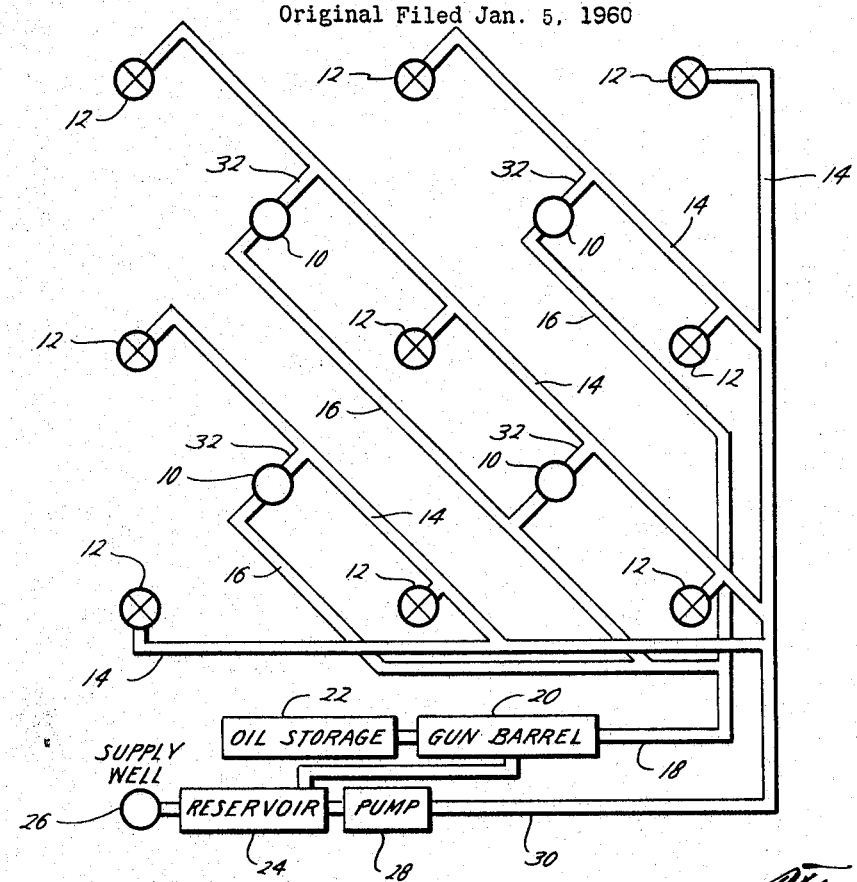

Jan. 17, 1967     O. B. SCHOENFELD ET AL     3,298,435

METHOD AND APPARATUS FOR PETROLEUM SECONDARY RECOVERY

Original Filed Jan. 5, 1960

Otto B. Schoenfeld
Joseph S. Newbrough
INVENTORS

United States Patent Office 3,298,435
Patented Jan. 17, 1967

3,298,435
METHOD AND APPARATUS FOR PETROLEUM SECONDARY RECOVERY
Otto B. Schoenfeld, P.O. Box 12155, Houston, Tex. 77017, and Joseph S. Newbrough, San Diego, Calif.; said Newbrough assignor to said Schoenfeld
Continuation of application Ser. No. 2,707, Jan. 15, 1960. This application Mar. 23, 1964, Ser. No. 366,212
7 Claims. (Cl. 166—9)

This application is a continuation of applicants' parent application, Serial Number 2,707, filed January 15, 1960, now abandoned.

This invention relates to a new system for the production of oil wells, and particularly to a system for more economical secondary recovery operations.

In the production of oil wells, it is often found that initially the formation pressure is sufficient to cause a flow of oil, or oil and salt water, from the well without any need for pumping or other methods of forcing the oil to the surface. Generally, however, after some time, the formation pressure drops so that the rate of production is lowered considerably, or even stopped completely.

In such an event, water flooding has often been used to revive the production, often resulting in a several fold increase in the rate of production of wells in the flooded region. Water flooding generally involves the injection of water or other injection liquid through one or more wells in the field to be flooded, into the formation, this water injection forcing oil in the formation toward production wells in the field.

At times it is also necessary or desirable to use pumping methods for production at economical rates, in addition to water flooding of the formation. Many different types of pumps have been used, including hydraulic lifting jacks, electric or gas driven pumps, jet type pumps, and walking-beam operated reciprocating pumps.

In the production of oil, varying proportions of water are generally produced with the oil, resulting from natural water in the well or water from the water flooding operation. This of course is objectionable, since the water must be disposed of, so generally this same water is separated from the oil and used for the water flooding operation. The water produced usually has a high concentration of salt and other minerals, and is quite corrosive, causing scaling of the well pipe and production lines. In addition, emulsions are formed which often casue clogging of lines and valves. In many fields paraffin deposits in the well pipe and production lines are also a problem. To prevent such scaling, corrosion, emulsion formation, and paraffin deposits, various chemicals and additives are injected into the system.

Often, after water flooding operations have been carried on for some time, the well will begin to flow, so that no pumping is required. However, the injection of additives is still desirable to prevent clogging of the production system.

It is an object of this invention to provide a new method for production of oil wells.

It is another object to provide a method for secondary recovery operations which includes an improved method for pumping a well.

Another object is to provide a secondary recovery method which includes an improved method for introducing treating agents into the liquid produced from the oil well.

Still another object is to provide an oil well production system having novel means for powering pumping apparatus.

Figure 2:
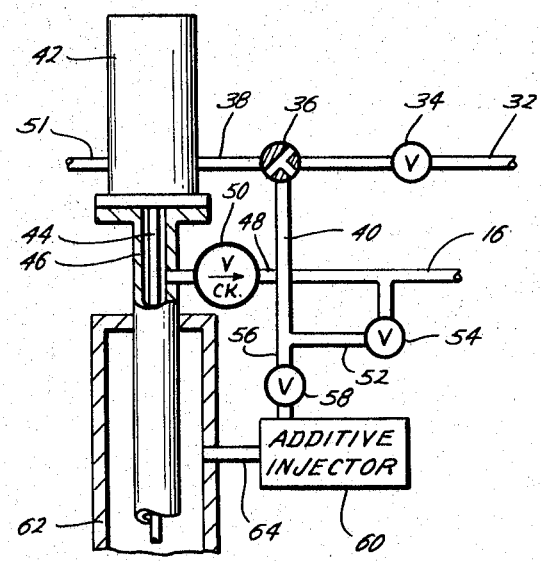

The accomplishment of these and other objects will become more apparent upon consideration of the following description and the accompanying drawing, wherein FIGURE 1 is a schematic portrayal of a group of wells showing the connection of various components for the practice of this invention, and FIGURE 2 is a partial sectional elevational view, somewhat schematic, of an oil well pump and associated equipment incorporating an embodiment of the invention.

According to the present invention, a unique arrangement of injection water and production lines is used, and a portion of the injection water is used to power pumping apparatus. In another embodiment of the invention, various additives are included in the injection water, a portion of which is fed into the casing of the production wells to prevent corrosion, scaling, emulsion formation, and paraffin deposition in the well pipe and production lines. In still another embodiment, the additives are included in only the portion of the injection water which is fed into the production well.

In water flooding operations, injection wells and production wells are generally spaced so that water injected into one or more injection wells will force oil to each production well. The spacing and arrangement of the wells is governed by the requirements of the formation to uniformly force oil in the formation toward the production wells. Such uniformity requires that injection wells be positioned around a production well to flood the formation from several directions toward the production well. Often four injection wells are arranged at the corners of a square around a production well at the center of the square, such an arrangement being known as a "five-spot" arrangement. At other times six injection wells are at the corners of a hexagon, with the production well at the center of the hexagon. This is a "seven-spot" arrangement. Thus these arrangements of wells may be called polygonal water flooding arrangements. In such such arrangements it is generally desirable to arrange the wells in a field in substantially straight lines, so that production wells are interspersed between injection wells in order to provide uniform flooding of the formation.

FIGURE 1 depicts a typical "five-spot" arrangement of a water flood. In this arrangement, each production well 10 is positioned to be flooded from four injection wells 12. Injection water branch lines, or conduits, 14 are provided for supplying water to the injection wells, and production branch lines 16 transport produced well fluids from the production wells to main production line 18. Preferably the diagonal arrangement of lines 14 and 16, as shown in the drawing, is used, since such an arrangement allows both lines to be placed in the same trench, and therefore reduces the cost of installation. The well fluids are carried through line 18 to gun barrel 20 where the oil and water are separated, the oil being deposited in oil storage tank 22 and the water in reservoir 24.

Where insufficient water is produced with the oil to perform the desired functions, additional water is obtained from a supply well 26. This well is therefore operated as necessary to keep the desired water level in reservoir 24. Pump 28 is provided to apply the necessary pressure in main water line, or conduit, 30 for injection, through lines 14, into injection wells 12.

Lines 14 also have branches, or further conduits 32 supplying water to the production wells. As shown in FIGURE 2, each branch 32 is fitted with a valve 34, and a three-way valve 36, the three-way valve connecting branch 32 with a hydraulic jack feed line 38 and a bypass line 40. Feed line 38 supplies water under pressure to hydraulically actuated pumping apparatus, such as a conventional hydraulic jack 42, which is fitted with proper valves to cause the reciprocation of pump rod 44, attached to a pump at the bottom of the well tubing 46. Well fluid is pumped out of tubing 46 through line 48 and check valve 50 and into production line 16. Exhaust water from hydraulic jack 42 may be returned to line 16 through exhaust line 51 or otherwise disposed of, as hereinafter set forth.

By-pass line 40 terminates in a return line 52 having a valve 54, for by-passing water into production line 16, and in line 56 containing a valve 58, for supplying water to additive injector 60, which may for example be of the type shown in U.S. Patent No. 2,148,671, to Allen. Water containing the additive is then supplied to the annulus in-between casing 62 and tubing 46 through line 64.

In another embodiment of the invention, the additive is combined with the exhaust water from hydraulic jack 42, since generally it is not necessary that this water be injected under high pressure.

In a third embodiment, the additive is combined with all the injection water in line 30, so that it is not necessary to combine it at the well head. In this embodiment, inhibited water is also available for injection into the injection wells.

It will be appreciated that three-way valve 36 may be turned to various positions to supply water to both hydraulic jack 42 and additive injector 60, or to either alone. Similarly, when additive has been combined with all the water, the three-way valve may be adjusted to supply water containing additive in a similar manner.

According to the process of this invention, injection water at high pressure is supplied to water branch lines 14, for injection into wells 12. A portion of this water is diverted, however, into branches 32, and used to power hydraulically operated pumping apparatus, such as by hydraulic jack 42, whereby the well is produced. In one embodiment of the invention, another portion of the water is diverted and an additive combined therewith for injection into the production well, in the annulus between the casing and the tubing, so that the additive is mixed with the well fluid produced from the well, thereby preventing scaling, corrosion, emulsion formation, or paraffin deposits in the well pump, well pipes, and production lines. When the additive is combined in line 30, a portion of the injection water containing the additive is injected directly into the production well. Thus pump 28 forcing fluid under pressure through line 30 and thereafter to injection wells 12 for water flooding and to production wells 10 for pump operation and/or chemical treatment, acts, along with the conduit lines, as a means of water flooding, power transmission and as an agent for the chemical treatment of wells.

Fluid produced from the well, generally a mixture of oil and water, is separated by means such as gun barrel 20, and the water returned to a reservoir for reuse as injection water.

It is well known to add various materials to the water injected into injection wells for prevention of deleterious effects on production equipment. However, the strength and effectiveness of these materials is greatly reduced by passage through the formation. Thus the injection of such inhibiting agents directly into the production well, in the manner of the present invention, is highly advantageous, resulting in improved results with less additive than has been required with previous methods. Such a procedure is especially advantageous when the water containing the additive is from the same system as the injection water, since the water and additive are then continuously recirculated. This prevents loss of additive, and the concentration of the additive is easily controlled at the pumping and water storage station.

The additive to be employed in the operation of this process will depend on the specific characteristics of the well fluid. For example, where the well fluid is extremely corrosive, a corrosive inhibitor will be added. In instances where the oil and water tend to emulsify, an emulsion breaker will be added.

When, as taught herein, a portion of the injection water is diverted for powering the pumping apparatus, the overall production system is greatly simplified, and the installation cost is substantially reduced. Using such a method, it is not necessary to install wiring for electric motors, or to supply fuel for internal combustion engines. The pumping rate is readily controlled, without power loss, simply by controlling the rate of flow of water to the hydraulic jack or other hydraulically operated pumping apparatus. A master valve on the main water line may stop, start, or throttle the production of the entire area for intermittent operation as desired. An important advantage is that hydraulically operated pumping equipment, such as hydraulic jacks and jet pumps, are less expensive than electric or gas driven units.

Still another advantage of operation according to the present invention is that a master valve may be installed in the production line 18, and the production of the entire field may be controlled by adjustment of this valve. In many instances it is desirable that production be intermittent, while water injection is continuous. Such intermittent production with continuous water drive often prevents channeling of the water through the formation, so that the water flooding operation is more efficient and the well liquid produced has a lower proportion of water. When using the apparatus and method of the present invention, closing down on the production line will put a back pressure on the pumping apparatus so as to stop production.

Although preferred embodiments of the invention have been shown and described herein, many modifications thereof will be apparent to those skilled in the art. The invention is therefore not limited to the preferred embodiment, but only as set forth by the following claims:

1. Apparatus for permitting secondary recovery of hydrocarbon products from a formation, said apparatus comprising:
    a source of fluids;
    first conduit means connecting said source to a plurality of injection wells;
    second conduit means branching from said first conduit means at points intermediate said source and said injection wells, and connecting each of said points to a production well, each of said production wells having tubing and casing therein;
    said second conduit means being so connected to each of said production wells that at least a portion of fluids passing through said second conduit means may be permitted to activate hydraulic pumping means, said pumping means being associated with each of said production wells; and
    combination water flooding and power transmission means for causing (1) a portion of the fluids from said source of fluids to, under pressure, pass through said first conduit means and into said injection wells, and (2) a further portion of said fluids from said source of fluids to, under pressure, pass through at least a portion of said first conduit means, then pass through said second means and activate said pumping means on said production wells.

2. The combination of claim 1, including third conduit means connecting said second conduit means to each of said production wells from points on said second conduit means intermediate said first conduit means and said production wells to a position on each of said production wells intermediate the tubing and casing of each of said production wells; and
    said third conduit means including means for variably providing chemical additives to said production wells on said combination means causing said fluids to flow.

3. The combination of claim 2 wherein there is further included means for returning fluids activating said pumping means to said source of fluids thereby permitting a substantial portion of said fluids to be continuously utilized.

4. A method for effecting secondary recovery from a producing formation comprising the steps of:
- providing a source of water under pressure;
- injecting said water into a conduit;
- directing a portion of said water through said conduit and into an injection well and, by pressure, cause said portion to enter said formation; and
- causing, by pressure, another portion of said water to pass through a portion of said conduit, be diverted therefrom and be injected into the pumping mechanism of a production well thereby activating said mechanism.

5. A method for effecting secondary recovery from a producing formation comprising the steps of
- providing a source of water under pressure;
- injecting said water under pressure into a conduit;
- directing a portion of said water injected into a conduit into an injection well and thereafter into said formation and toward a plurality of production wells;
- causing another portion of said water under pressure to pass through at least a portion of said conduit, be diverted therefrom, have chemical additives mixed therewith forming a first mixture, said first mixture then injected into at least one of said production wells, and evacuating from said one production well a second mixture including (1) fluids passing through said injection well and thereafter through said formation and into said one production well and (2) said first mixture.

6. A method for effecting secondary recovery from a producing formation comprising the steps of:
- providing a source of water under pressure;
- injecting said water under pressure into a conduit;
- causing at least a portion of said water under pressure to pass through said conduit and enter an injection well, pass therethrough and enter said formation;
- causing another portion of said water under pressure to pass through at least a portion of said conduit, be diverted therefrom and causing said another portion to operate pumping mechanism on production wells and causing at least part of said another portion to be returned to said source after operating said mechanism.

7. A method for effecting secondary recovery from a producing formation comprising the steps of:
- providing a source of water under pressure;
- injecting said water under pressure into a conduit;
- causing a portion of said water under pressure to pass through said conduit and enter an injection well, pass therethrough and enter said formation;
- causing another portion of said water under pressure to pass through at least a portion of said conduit and be diverted therefrom;
- forcing a first portion of said diverted water to be mixed with chemical additives and thereafter into a production well between its tubing and casing; and
- causing a second portion of said diverted water to activate a pumping mechanism associated with said production well.

References Cited by the Examiner

UNITED STATES PATENTS

| | | | |
|---|---|---|---|
| 1,257,875 | 2/1918 | Kafader | 166—45 X |
| 1,892,636 | 12/1932 | Slater | 166—45 X |
| 2,089,035 | 8/1937 | Oberlin | 166—1 |
| 2,161,922 | 6/1939 | Goode. | |
| 2,875,836 | 3/1959 | Stiff et al. | 166—9 X |

OTHER REFERENCES

Uren: Petroleum Production Engineering, Oil Field Exploitation, 2d edition, McGraw-Hill Book Co., N.Y., 1939, TN 870, U7 1934 (pp. 444 through 459).

CHARLES E. O'CONNELL, *Primary Examiner.*

S. J. NOVOSAD, *Assistant Examiner.*